US011509676B2

(12) United States Patent
Huffman et al.

(10) Patent No.: US 11,509,676 B2
(45) Date of Patent: Nov. 22, 2022

(54) DETECTING UNTRACKED SOFTWARE COMPONENTS ON AN ASSET

(71) Applicant: Tenable, Inc., Columbia, MD (US)

(72) Inventors: Tony Huffman, Mooresville, IN (US); Nicholas Miles, Georgetown, KY (US)

(73) Assignee: TENABLE, INC., Columbia, MD (US)

( * ) Notice: Subject to any disclaimer, the term of this patent is extended or adjusted under 35 U.S.C. 154(b) by 282 days.

(21) Appl. No.: 16/749,796

(22) Filed: Jan. 22, 2020

(65) Prior Publication Data

US 2021/0226981 A1 Jul. 22, 2021

(51) Int. Cl.
*H04L 9/40* (2022.01)
*G06F 16/17* (2019.01)

(52) U.S. Cl.
CPC ...... *H04L 63/1433* (2013.01); *G06F 16/1734* (2019.01); *H04L 63/1425* (2013.01)

(58) Field of Classification Search
CPC ............ H04L 63/1433; H04L 63/1425; G06F 16/1734; G06F 21/577
See application file for complete search history.

(56) References Cited

U.S. PATENT DOCUMENTS

| 5,440,723 | A | * | 8/1995 | Arnold | G06F 21/566 |
| | | | | | 714/33 |
| 8,127,354 | B1 | | 2/2012 | Bettini et al. | |
| 8,661,547 | B1 | * | 2/2014 | Kononov | G06F 16/122 |
| | | | | | 713/176 |
| 9,152,694 | B1 | * | 10/2015 | Padidar | G06F 16/285 |
| 9,152,789 | B2 | * | 10/2015 | Natarajan | G06F 21/566 |
| 9,390,266 | B1 | * | 7/2016 | Zakorzhevsky | G06F 3/0481 |
| 10,148,694 | B1 | * | 12/2018 | Sarin | H04W 12/02 |
| 10,432,648 | B1 | * | 10/2019 | Xu | H04L 63/1416 |
| 2002/0059245 | A1 | * | 5/2002 | Zakharov | G06F 16/1734 |
| 2007/0028304 | A1 | * | 2/2007 | Brennan | G06F 21/55 |
| | | | | | 726/24 |
| 2011/0295806 | A1 | * | 12/2011 | Erofeev | G06F 11/1471 |
| | | | | | 707/634 |

(Continued)

FOREIGN PATENT DOCUMENTS

WO WO-2008031055 A2 * 3/2008 ........... G06F 16/137
WO WO-2015077790 A1 * 5/2015 ........... H04L 63/105

OTHER PUBLICATIONS

PatchCleaner—safely clean your windows installer directory | homedev—software development out of the box. pp. 1-19. https://www.homedev.com.au/free/patchcleaner Jan. 17, 2020.

*Primary Examiner* — Sarah Su
(74) *Attorney, Agent, or Firm* — Muncy, Geissler, Olds & Lowe, P.C.; Daniel Podhajny

(57) ABSTRACT

In an embodiment, an asset may utilize one or more scanning techniques to detect a first set of software components that is not being natively tracked by an operating system of the asset, the one or more scanning techniques comprising one or more of an evaluation of metadata associated with one or more running processes of the asset, and an evaluation of file system information that characterizes the first set of software components. The asset may further store an indication of the first set of software components detected in accordance with the one or more scanning techniques, and may optionally report the indication to an external entity (e.g., a vulnerability management system).

30 Claims, 5 Drawing Sheets

(56) References Cited

U.S. PATENT DOCUMENTS

| | | | |
|---|---|---|---|
| 2012/0110174 A1* | 5/2012 | Wootton | H04L 63/1416 709/224 |
| 2013/0055398 A1* | 2/2013 | Li | G06F 21/577 726/25 |
| 2015/0310215 A1* | 10/2015 | McBride | G06F 21/577 726/25 |
| 2017/0091216 A1* | 3/2017 | Fuchs | G06F 11/3476 |
| 2019/0132334 A1* | 5/2019 | Johns | H04L 63/145 |
| 2019/0199688 A1* | 6/2019 | Wallace | H04L 63/0272 |
| 2021/0211453 A1* | 7/2021 | Cooney | G06F 21/577 |
| 2022/0100854 A1* | 3/2022 | Ahmed | H04L 63/1433 |

* cited by examiner

DETECTING UNTRACKED SOFTWARE COMPONENTS ON AN ASSET

TECHNICAL FIELD

The various aspects and embodiments described herein generally relate to methods and systems for detecting untracked software components on an asset.

BACKGROUND

Most operating systems provide a way to register software installations that allow for software to be easily enumerated and inventoried. In addition, to these registered software components, however, there often exist many individual software components that are embedded with the registered software (such as libraries, runtime binaries, etc.) that are untracked, and hence cannot be inventoried.

Moreover, since the current technology for enumerating software components typically relies on software registry systems provided by the operating system, the problem of failing to inventory all software installation provides a gap in essential business management information which adversely impacts productivity, efficiency, and budgeting decisions, as well as the security of IT systems.

The advent of cloud computing and software subscription services has exacerbated the problem by increasing the probability that untracked individual software components will exist in greater numbers by virtue of these relatively new software delivery systems, as compared to the previous method of purchasing software for a set number of years before upgrading to a new version of the software.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In an embodiment, an asset may utilize one or more scanning techniques to detect a first set of software components that is not being natively tracked by an operating system of the asset, the one or more scanning techniques comprising one or more of an evaluation of metadata associated with one or more running processes of the asset, and an evaluation of file system information that characterizes the first set of software components. The asset may further store an indication of the first set of software components detected in accordance with the one or more scanning techniques, and may optionally report the indication to an external entity (e.g., a vulnerability management system).

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
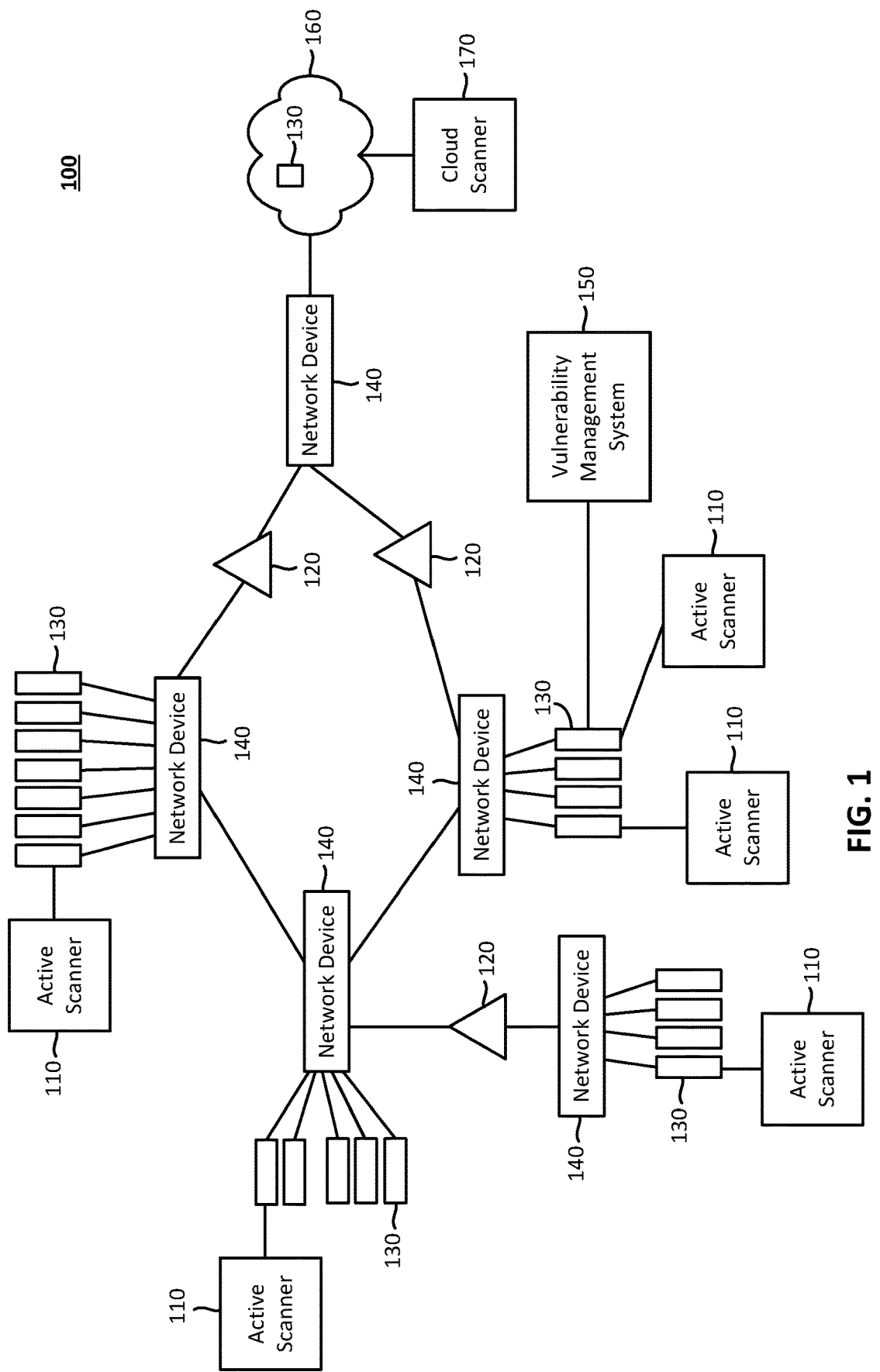
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. In addition, the attack surface may include one or more untracked and/or orphan software components. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
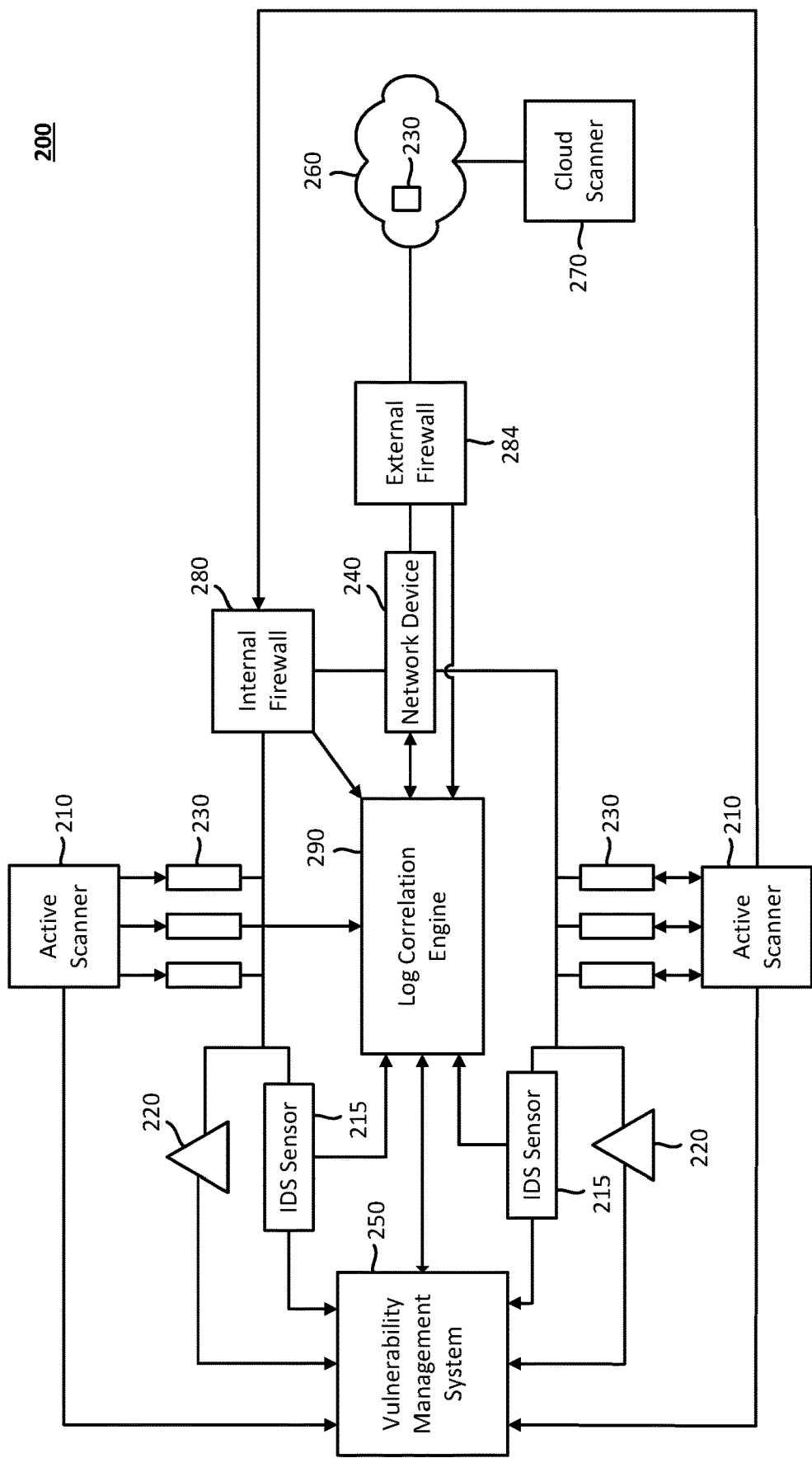
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, software and software components inventories, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, software usage or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system (IDS) sensor 215, which may provide the passive scanners 220 with visibility relating to intrusion events or other security exceptions that the IDS sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and inventory untracked software of assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information, including software inventory information, that further describes the network 200, and the log correlation engine 290 may collect additional information to further identify the vulnerabilities, assets, providing for a software inventory of the network 200, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage and conduct a software inventory of the network 200.

Security auditing applications typically display security issues (such as vulnerabilities, security misconfigurations, weaknesses, etc.) paired with a particular solution for that given issue. In some systems, security audits may need to be as complete as possible and, therefore, may necessitate that the inventory of untracked software also be as complete as possible. Certain security issues may share a given solution, or have solutions which are superseded or otherwise rendered unnecessary by other reported solutions.

Figure 3:
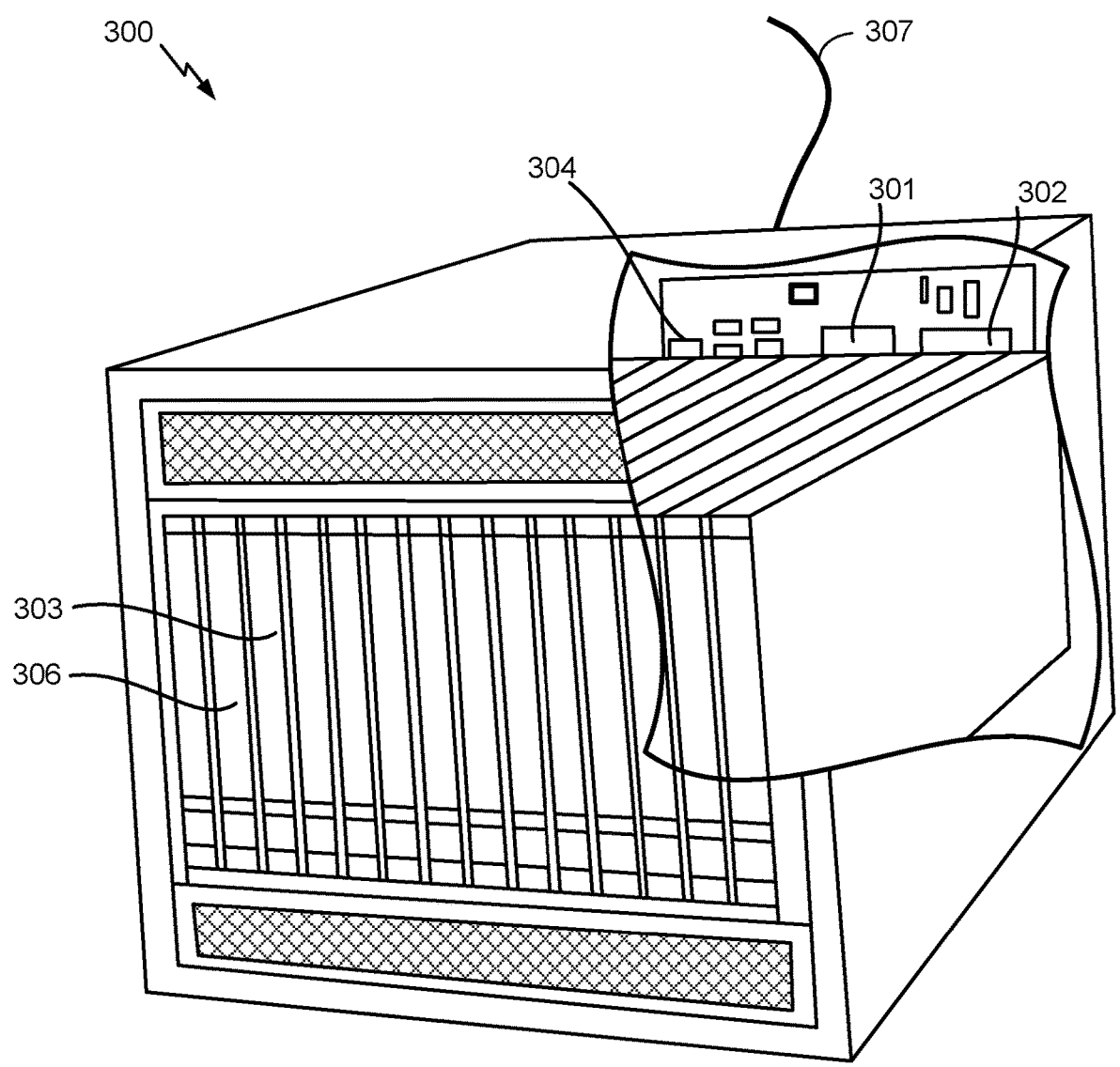
FIG. 3 illustrates a server in accordance with an embodiment of the disclosure.

The various embodiments may be implemented on any of a variety of commercially available server devices, such as server 300 illustrated in FIG. 3. In an example, the server 300 may correspond to one example configuration of a server on which a security auditing application may execute, which in certain implementations may be included as part of the vulnerability management system 150 of FIG. 1 or the vulnerability management system 250 of FIG. 2. In an alternative example, the server 300 may correspond to an asset, such as one of assets 130 of FIG. 1 or one of assets 230 of FIG. 2. In FIG. 3, the server 300 includes a processor 301 coupled to volatile memory 302 and a large capacity non-volatile memory, such as a disk drive 303. The server 300 may also include a floppy disc drive, compact disc (CD) or DVD disc drive 306 coupled to the processor 301. The server 300 may also include network access ports 304 coupled to the processor 301 for establishing data connections with a network 307, such as a local area network coupled to other broadcast system computers and servers or to the Internet.

While FIG. 3 illustrates an example whereby a server-type apparatus 300 may implement various processes of the disclosure, in other aspects the various processes of the disclosure may be implemented by a user equipment (UE). For example, one or more of the assets 130 of FIG. 1 and/or assets 230 of FIG. 2 may be implemented as a UE, in some designs.

Figure 4:
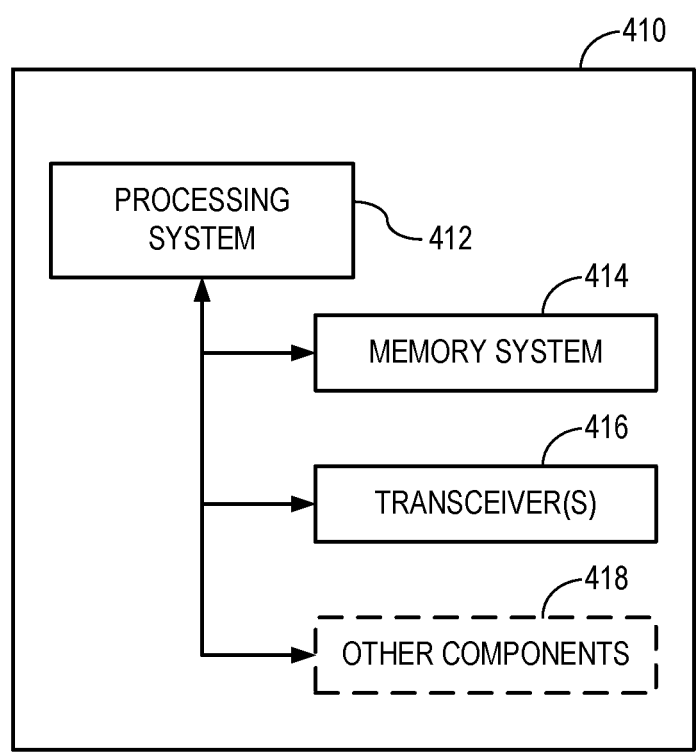
FIG. 4 illustrates a UE in accordance with aspects of the disclosure.

FIG. 4 illustrates a UE 410 in accordance with aspects of the disclosure. In some designs, UE 410 may correspond to any UE-type that is capable of executing a software inventory audit (e.g., for untracked and/or orphan software components as will be described in more detail below), including but not limited to a mobile phone or tablet computer, a laptop computer, a desktop computer, a wearable device (e.g., smart watch, etc.), and so on. The UE 410 depicted in FIG. 4 includes a processing system 412, a memory system 414, and at least one transceiver 416. The UE 410 may optionally include other components 418 (e.g., a graphics card, various communication ports, etc.).

The processing system 412 may include one or more microprocessors, microcontrollers, and/or digital signal processors that provide processing functions, as well as other calculation and control functionality. The memory system 414 may be configured to store data and/or instructions for executing programmed functionality within the UE 410. The memory system 414 may include on-board memory that is, for example, in a same integrated circuit package as the processing system 412. Additionally or alternatively, the memory system 414 may include memory that is external to the processing system 412 and functionally coupled over a common bus. The transceiver(s) 416 may comprise wired communication interface(s) (e.g., Ethernet ports, USB ports, etc.) and/or wireless communication interface(s) (e.g., to support cellular communications, Wi-Fi communications, satellite communications, Bluetooth or NFC communications, etc.).

It will be understood that the UE 410 may be a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, a device in an automotive vehicle, and/or any other device with a need for position sensing capability. As such, the UE 410 may include any number of other components 418.

Most operating systems provide a way to register software installations that allows for software to be easily enumerated and inventoried (i.e., tracked). In addition to these registered software components, there often exist many individual software components that are embedded with the registered software (such as libraries, runtime binaries, etc.) that are untracked, and hence cannot be inventoried. As used herein, an "untracked" software component corresponds to a software component that is not natively inventoried (e.g., independently of an associated registered or inventoried software component) by a respective operating system of an asset that is configured to execute the software component. An "orphaned" software component is a particular type of untracked software component that was previously associated with a tracked "parent" software component (e.g., the parent software component was removed, but the orphaned software component remains). As used herein, a "software component" corresponds to software file(s) (e.g., an executable file such as an .exe file, etc.) or alternatively to a running process or instance of such software file(s).

Figure 5:
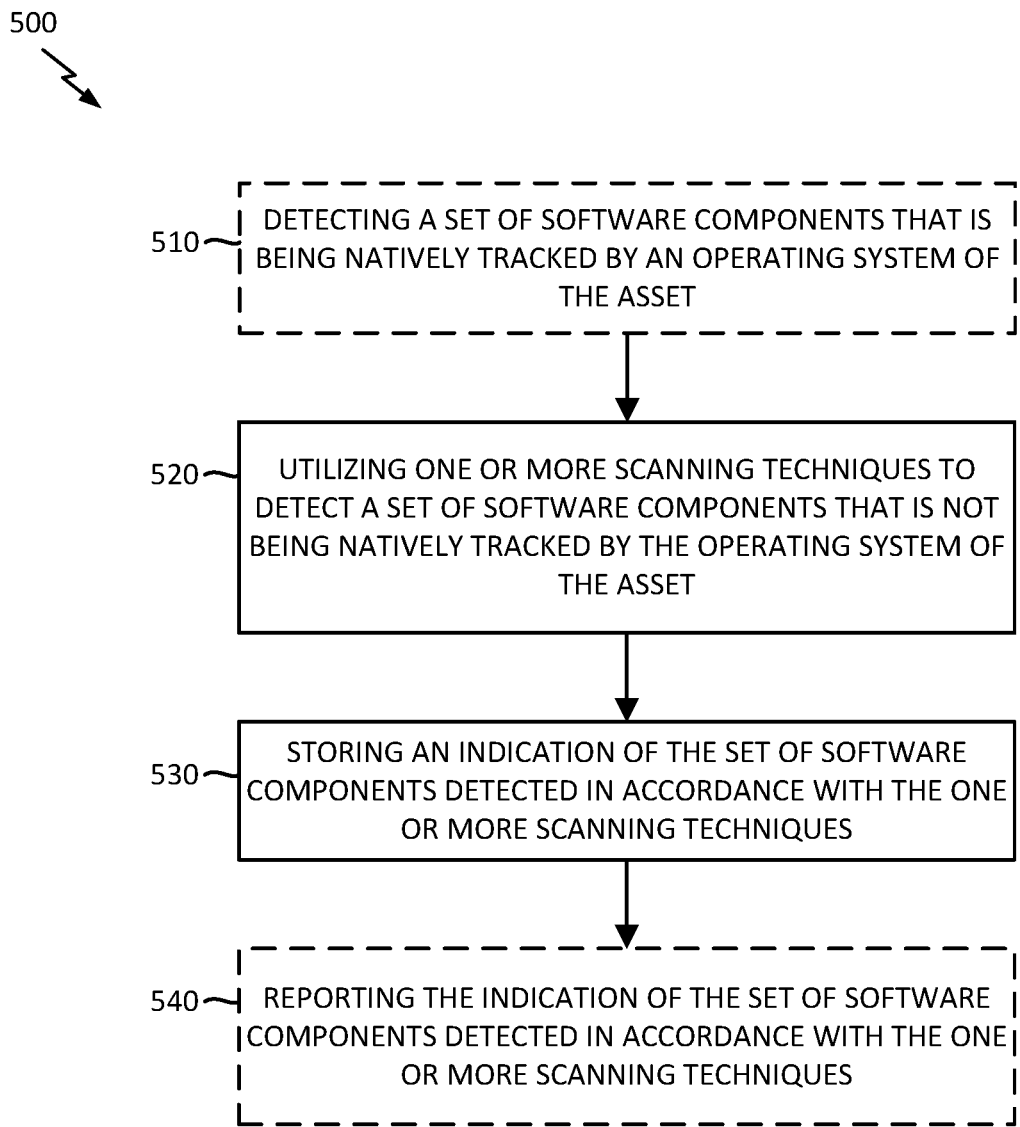
FIG. 5 illustrates a process in accordance with an embodiment of the disclosure.

FIG. 5 illustrates a process 500 in accordance with an embodiment of the disclosure. In an example, the process 500 may be implemented by an asset, such as one of assets 130 of FIG. 1 or one of assets 230 of FIG. 2. The asset performing the process 500 of FIG. 5 may be implemented as an apparatus, such as the server 300 of FIG. 3 or the UE 400 of FIG. 5.

Referring to FIG. 5, at 510, the asset optionally detects a set of software components that is being natively tracked by an operating system of the asset. For example, the optional detection at 510 may be implemented by accessing a software registry system of the operating system. For example, in case of a Microsoft Windows operating system, the Windows Registry or available package management system may be accessed to determine which software is already installed on the asset.

Referring to FIG. 5, at 520, the asset utilizes one or more scanning techniques to detect a set of software components that is not being natively tracked by an operating system of the asset, the one or more scanning techniques. In particular, the one or more scanning techniques comprise one or more of an evaluation of metadata associated with one or more running processes of the asset, and evaluation of file system information that characterizes the set of software components. As used herein, file system information that 'characterizes' the set of software components at 520 may comprise any information that indicates the presence of such untracked software components (e.g., filenames or partial filenames of known untracked software components for a particular operating system, MD5 hashes of particular files associated with known untracked software components for a particular operating system, etc.).

At 530, the asset stores (e.g., in local memory) an indication of the set of software components detected in accordance with the one or more scanning techniques. At 540, the asset optionally reports the indication of the set of software components detected in accordance with the one or more scanning techniques. For example, the indication may be reported to a vulnerability management system (e.g., vulnerability management system 250 or an associated component, such as one or more scanners 210/220/270, log correlation engine 290, etc.). While not shown expressly in FIG. 5, the component to which the indication is reported may factor the detected set of untracked software components into a vulnerability assessment of the asset and/or a network comprising the asset.

Referring to FIG. 5, in an example related to the scanning technique which comprises the evaluation of metadata associated with the one or more running processes of the asset, the asset at 520 may retrieve metadata via one or more operating system interfaces that is indicative of binaries and/or libraries associated with the one or more running processes. In this case, the evaluation of the metadata may comprise populate, among the set of software components that is not being natively tracked by the operating system of the asset, a set of binaries and/or libraries detected via the metadata that is not already being natively tracked by the operating system.

Referring to FIG. 5, in an example related to the scanning technique which comprises the evaluation of metadata associated with the one or more running processes of the asset, the metadata may relate to the running process itself, or alternatively to one or more associated executable modules (e.g., files) to back-trace where can be found in particular areas of a file system (e.g., particular areas of memory). In this case, a subsequent search for those module(s) may be limited to those particular areas of the file system so as to increase the speed of the search for untracked software components.

Referring to FIG. 5, in an example related to the scanning technique which comprises the evaluation of the file system information, the asset at 520 may scan at least part of a file system of the asset, may compare, during the scanning, files of the file system with a set of software parameters associated with a set of known untracked software components, and may populate, among the set of software components that is not being natively tracked by the operating system of the asset, one or more files that match at least part of the set of software parameters based on the comparison. In an example, the file system scan may be based upon one or more signature based detection mechanisms (e.g. file hashes, pattern matching, etc.) to locate untracked and/or orphaned software components. For example, a set of pre-defined MD5 hashes may be derived in association with known software components that go untracked on one or more operating systems, and hashes can be taken of files during the above-noted file scan at 520 of FIG. 5 and compared with the set of pre-defined MD5 hashes to identify the untracked software components. In this case, the file system information comprises part of the underlying file itself. However, in other aspects, the file system information may comprise file metadata (e.g., filename, etc.).

Referring to FIG. 5, in an example related to an implementation of 520 that comprises both the evaluation of the metadata and the evaluation of the file system information, the asset at 520 may identify (based on running process metadata evaluation) one or more historical running processes that executed previously on the asset, and may implement (as part of the file system information evaluation) a targeted search of a file system to detect at least one software component associated with the one or more historical running processes. In this case, historical running process metadata is evaluated (as opposed to current running process metadata), and this initial analysis may function as an input that limits the scope of a subsequent file system scan by the asset. In an example, the historical running process metadata may comprise most recently used (MRU) data, which can be used to infer probable locations of untracked software components in particular file system areas (or memory locations, e.g., on disk).

Referring to FIG. 5, in an example, the asset at 520 may implement the scanning technique(s) via execution of an agent that executes locally on the asset. In some designs, the asset is an integrated asset that is permanently or semi-permanently installed on the asset. In this case, the scan(s) at 520 may be implemented in accordance with a pre-defined or dynamically configured schedule, or alternatively may be triggered in response to a request from an external entity, such as one of the active scanners 110 of FIG. 1 or 210 of FIG. 2. Alternatively, the asset at 520 may implement the scanning technique(s) via execution of a so-called 'dissolvable' agent, or an agent that is temporarily installed on the asset for implementation of the one or more scanning techniques at 520 (e.g., and/or associated/tangential operations, such as reporting the scan results, etc.). In this case, the asset at 520 may download and execute (or install) the dissolvable agent from an external entity (e.g., one of the active scanners 110 of FIG. 1 or 210 of FIG. 2), and may delete and/or uninstall the dissolvable agent at some point after the scan(s) are completed.

An example implementation of the process of FIG. 5 will now be described with respect to a particular operating system, i.e., Microsoft Windows.

As an initial operation, the Windows Registry or available package management systems to determine what software is installed is already tracked (e.g., as in 510 of FIG. 5). Next, a Windows Application Programming Interface (API) is used to detect binaries/libraries that were not discovered from the Windows Registry (e.g., as in 520 of FIG. 5). Further exploration of other data sources such as most recently used (MRU) data, startup scripts and/or startup items in the Windows Registry can also be mined to discover other binary paths not already discovered. Next, the file system can be searched via basic known patterns for file names commonly associated with hard to track software (e.g., as part of 520 of FIG. 5). The searching performed here could be precise, such as looking directly into a known set of locations, or alternatively can sweep over the entire file system looking for file name patterns. As a further step, the file system can be scanned to search for patterns within files that are known to identify untracked software, configurations, or settings (e.g., as part of 520 of FIG. 5). This could be a targeted search looking into known locations for the desired detection (e.g., known locations associated with orphaned/untrack software associated with already detected running processes, either currently running or historically running via MRU), or alternatively could be implemented as a wider detection scanning the entire file system.

Various tools and/or operating system interfaces may be leveraged to perform at least some part of the scanning technique(s) used at 520 of FIG. 5 to detect the orphaned and/or untracked software components, including any of the following:

Yara: an open source pattern matching tool that labels itself as a malware hunting tool but really it is a tool that can be used for discovery in many other ways.

Windows Registry: a database on Windows systems that can be accessed through API calls and contains information about installed software (including installation paths). The information is added to the registry by the software installer during installation.

Package Management System: many Operating Systems employ a central system for installing and updating software. Individual pieces of installed software can be enumerated by utilizing the management interface. Examples of such package management systems include apt, yum, dnf, pacman, etc., which are commonly used to install Linux packages (e.g., RPM, DEB, etc. files). Package managers exist on other platforms, such as homebrew & macports on macOS and NuGet on Windows.

MRU: contains a history of the programs or documents that were previously accessed by the asset.

In some designs, the process 500 of FIG. 5 may be used to identify hard-to-detect software components on an asset, including but not limited to Java, Apache Struts, and/or Jboss software components. Other hard-to-detect software components that may be identified via the process of FIG. 5 include, but are not limited to:

.NET Framework
Microsoft Windows shared libraries (e.g., WinSxS)
Spring
Python
Ruby
Lua
Perl
PostgreSQL
Configuration files
Portable browsers (e.g., headless Chrome, etc.)

In some designs, the process 500 of FIG. 5 may be implemented via a plug-in feed, e.g., in the form of compiled Nessus Attack Scripting Language (NASL) binaries (NBINs). In some designs, to further supplement the scanning technique(s) at 520 of FIG. 5, various aspects (e.g., scanning memory structures, examining library import tables in installed software, etc.) may be further utilized.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. In some designs, the inventory mechanisms used to log the set of untracked software components may comprise Windows side-by-side assembly (SxS) (Windows component store), cachefilesd on Linx, Spotlight database on macOS, and so on. Static analysis, with or without a filetype detection engine (similar to libmagic), could also be used to detect untracked software components in statically-linked or dynamically-linked binaries on the asset at 520 of FIG. 5 in other embodiments.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of software component discovery of an asset in a network, comprising:

utilizing one or more scanning techniques to detect a first set of software components that is configured for execution on the asset and is not being natively tracked by an operating system of the asset, the one or more scanning techniques comprising one or more of:
an evaluation of metadata associated with one or more running processes of the asset, and
an evaluation of file system information that characterizes the first set of software components; and
storing an indication of the first set of software components detected in accordance with the one or more scanning techniques.

2. The method of claim 1, wherein the one or more scanning techniques comprise the evaluation of the metadata.

3. The method of claim 2,
wherein the metadata is retrieved via one or more operating system interfaces and is indicative of binaries and/or libraries associated with the one or more running processes, and
wherein the evaluation of the metadata comprises populating, among the first set of software components, a set of binaries and/or libraries detected via the metadata that is not already being natively tracked by the operating system.

4. The method of claim 1, wherein the one or more scanning techniques comprise the evaluation of the file system information.

5. The method of claim 4, wherein the evaluation of the file system information comprises:
scanning at least part of a file system of the asset;
comparing, during the scanning, files of the file system with a set of software parameters associated with a set of known untracked software components; and
populating, among the first set of software components, one or more files that match at least part of the set of software parameters based on the comparing.

6. The method of claim 1, wherein the one or more scanning techniques comprise both the evaluation of the metadata and the evaluation of the file system information.

7. The method of claim 6,
wherein the evaluation of the metadata comprises identification of one or more historical running processes that executed previously on the asset, and
wherein the evaluation of the file system information comprises a targeted search of a file system to detect at least one software component associated with the one or more historical running processes.

8. The method of claim 1, further comprising:
detecting a second set of software components that is being natively tracked by the operating system of the asset,
wherein the utilizing occurs after the second set of software components is detected.

9. The method of claim 1, further comprising:
reporting the indication of the first set of software components detected in accordance with the one or more scanning techniques.

10. The method of claim 1,
wherein the utilizing is implemented via an integrated agent maintained on the asset, or
wherein the utilizing is implemented via a dissolvable agent that is temporarily installed on the asset for implementation of the one or more scanning techniques.

11. An asset in a network, comprising:
a memory; and
at least one processor communicatively coupled to the memory and configured to:
utilize one or more scanning techniques to detect a first set of software components that is configured for execution on the asset and is not being natively tracked by an operating system of the asset, the one or more scanning techniques comprising one or more of:
an evaluation of metadata associated with one or more running processes of the asset, and
an evaluation of file system information that characterizes the first set of software components; and
store an indication of the first set of software components detected in accordance with the one or more scanning techniques.

12. The asset of claim 11, wherein the one or more scanning techniques comprise the evaluation of the metadata.

13. The asset of claim 12,
wherein the metadata is retrieved via one or more operating system interfaces and is indicative of binaries and/or libraries associated with the one or more running processes, and
wherein the evaluation of the metadata comprises populating, among the first set of software components, a set of binaries and/or libraries detected via the metadata that is not already being natively tracked by the operating system.

14. The asset of claim 11, wherein the one or more scanning techniques comprise the evaluation of the file system information.

15. The asset of claim 14, wherein the evaluation of the file system information comprises:
scanning at least part of a file system of the asset;
comparing, during the scanning, files of the file system with a set of software parameters associated with a set of known untracked software components; and
populating, among the first set of software components, one or more files that match at least part of the set of software parameters based on the comparing.

16. The asset of claim 11, wherein the one or more scanning techniques comprise both the evaluation of the metadata and the evaluation of the file system information.

17. The asset of claim 16,
wherein the evaluation of the metadata comprises identification of one or more historical running processes that executed previously on the asset, and
wherein the evaluation of the file system information comprises a targeted search of a file system to detect at least one software component associated with the one or more historical running processes.

18. The asset of claim 11,
wherein the at least one processor is further configured to detect a second set of software components that is being natively tracked by the operating system of the asset, and
wherein the at least one processor is configured to utilize the one or more scanning techniques after the second set of software components is detected.

19. The asset of claim 11, wherein the at least one processor is further configured to report the indication of the first set of software components detected in accordance with the one or more scanning techniques.

20. The asset of claim 11,
wherein the at least one processor is further configured to utilize the one or more scanning techniques via an integrated agent maintained on the asset, or wherein the at least one processor is further configured to utilize the one or more scanning techniques via a dissolvable agent that is temporarily installed on the asset for implementation of the one or more scanning techniques.

21. A non-transitory computer-readable medium containing instructions stored thereon, which, when executed by an asset in a network, cause the asset to perform operations, the instructions comprising:
at least one instruction configured to cause the asset to utilize one or more scanning techniques to detect a first set of software components that is configured for execution on the asset and is not being natively tracked by an operating system of the asset, the one or more scanning techniques comprising one or more of:
an evaluation of metadata associated with one or more running processes of the asset, and
an evaluation of file system information that characterizes the first set of software components; and
at least one instruction configured to cause the asset to store an indication of the first set of software components detected in accordance with the one or more scanning techniques.

22. The non-transitory computer-readable medium of claim 21, wherein the one or more scanning techniques comprise the evaluation of the metadata.

23. The non-transitory computer-readable medium of claim 22,
wherein the metadata is retrieved via one or more operating system interfaces and is indicative of binaries and/or libraries associated with the one or more running processes, and
wherein the evaluation of the metadata comprises populating, among the first set of software components, a set of binaries and/or libraries detected via the metadata that is not already being natively tracked by the operating system.

24. The non-transitory computer-readable medium of claim 21, wherein the one or more scanning techniques comprise the evaluation of the file system information.

25. The non-transitory computer-readable medium of claim 24, wherein the evaluation of the file system information comprises:
scanning at least part of a file system of the asset;
comparing, during the scanning, files of the file system with a set of software parameters associated with a set of known untracked software components; and
populating, among the first set of software components, one or more files that match at least part of the set of software parameters based on the comparing.

26. The non-transitory computer-readable medium of claim 21, wherein the one or more scanning techniques comprise both the evaluation of the metadata and the evaluation of the file system information.

27. The non-transitory computer-readable medium of claim 26,
wherein the evaluation of the metadata comprises identification of one or more historical running processes that executed previously on the asset, and
wherein the evaluation of the file system information comprises a targeted search of a file system to detect at least one software component associated with the one or more historical running processes.

28. The non-transitory computer-readable medium of claim 21, further comprising:
at least one instruction configured to cause the asset to detect a second set of software components that is being natively tracked by the operating system of the asset, and
wherein the at least one instruction configured to cause the asset to utilize is configured to cause the asset to utilize the one or more scanning techniques after the second set of software components is detected.

29. The non-transitory computer-readable medium of claim 21, further comprising:
at least one instruction configured to cause the asset to report the indication of the first set of software components detected in accordance with the one or more scanning techniques.

30. The non-transitory computer-readable medium of claim 21,
wherein the at least one instruction configured to cause the asset to utilize is configured to cause the asset to utilize the one or more scanning techniques via an integrated agent maintained on the asset, or
wherein the at least one instruction configured to cause the asset to utilize is configured to cause the asset to utilize the one or more scanning techniques via a dissolvable agent that is temporarily installed on the asset for implementation of the one or more scanning techniques.

* * * * *